United States Patent
Matsumoto et al.

(10) Patent No.: US 6,798,535 B1
(45) Date of Patent: Sep. 28, 2004

(54) PRINTER HEAD AND PRINTER APPARATUS

(75) Inventors: Nobuyuki Matsumoto, Tokyo (JP); Ichiro Saito, Yokohama (JP); Hiroyuki Ishinaga, Tokyo (JP); Yoshiyuki Imanaka, Kawasaki (JP); Yoichi Taneya, Yokohama (JP); Muga Mochizuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 752 days.

(21) Appl. No.: 09/591,219

(22) Filed: Jun. 12, 2000

(30) Foreign Application Priority Data

Jun. 14, 1999 (JP) .......................................... 11-167372

(51) Int. Cl.[7] .............................................. G06F 15/00
(52) U.S. Cl. ........................ 358/1.8; 358/1.9; 358/1.13
(58) Field of Search ................................ 358/1.8, 1.13, 358/1.9, 1.5, 434, 442, 443; 347/14, 15, 49, 50; 710/10, 16, 19

(56) References Cited

U.S. PATENT DOCUMENTS

| | | | |
|---|---|---|---|
| 4,827,349 A | * 5/1989 | Ogata et al. | 358/434 |
| 5,828,386 A | 10/1998 | Okada et al. | 347/9 |
| 5,854,886 A | 12/1998 | MacMillan et al. | 358/1.15 |
| 5,877,784 A | 3/1999 | Maru et al. | 347/12 |
| 5,886,713 A | 3/1999 | Okada et al. | 347/14 |
| 6,128,098 A | * 10/2000 | Kamada et al. | 358/1.8 |
| 6,281,914 B1 | * 8/2001 | Hiwada et al. | 347/50 |
| 6,539,031 B1 | * 3/2003 | Ngoc et al. | 370/470 |
| 6,574,678 B1 | * 6/2003 | Nykanen et al. | 710/10 |

FOREIGN PATENT DOCUMENTS

| | | |
|---|---|---|
| EP | 0 631 870 | 1/1995 |
| EP | 0 881 817 | 12/1998 |
| JP | 07-76153 | 3/1995 |
| JP | 10-31566 | 2/1998 |
| JP | 10-065867 | 3/1998 |

* cited by examiner

*Primary Examiner*—Twyler Lamb
(74) *Attorney, Agent, or Firm*—Fitzpatrick, Cella, Harper & Scinto

(57) ABSTRACT

The present invention provides a printer head having a plurality of print elements for effecting recording on a recording medium on the basis of printer information inputted from outside, comprising an interface circuit for converting input of the printer information corresponding to communication interface standard for high speed data transferring into data processable in the print head and for outputting the converted data, and in which the recording on the recording medium is effected by the print elements in accordance with the printer information outputted from the interface circuit. A printer apparatus having such a printer head is also provided.

21 Claims, 6 Drawing Sheets

PRINTER HEAD AND PRINTER APPARATUS

BACKGROUND OF THE INVENTION

1. Field of the Invention

The present invention relates to a printer head and a printer apparatus, and more particularly, it relates to a printer head and a printer apparatus, in which data is transferred from a host computer at a high speed.

2. Related Background Art

FIG. 6 is a block diagram showing an example of a system using a conventional printer apparatus.

As shown in FIG. 6, in the conventional system, printer information is transferred between a printer apparatus 220 and a host computer 10 by using a computer communication interface. The host computer 10 is provided with an interface circuit 11 for outputting the printer information to the printer apparatus 220 by using the computer communication interface, and the printer apparatus 220 is provided with an interface circuit 221 for receiving the printer information transferred from the host computer 10, an MPU (Micro Processing Unit) 222 for controlling the entire apparatus on the basis of the information, a ROM 226, and a RAM 226, a motor 224 controlled by the MPU 222 and adapted to convey a recording medium (not shown), a parallel/serial converting portion 223 for converting the information (parallel data) processed by the MPU 222 into serial data and outputting such serial data, and a printer head 230 for effecting recording by discharging ink onto the recording medium on the basis of the data outputted from the parallel/serial converting portion 223. Incidentally, the interface circuit 221 and the MPU 222 are interconnected through a bus 227, the MPU 222 and the ROM 225 are interconnected through a cable 274, the MPU 222 and the parallel/serial converting portion 223 are interconnected through a cable 271, and the parallel/serial converting portion 223 and the printer head 230 are interconnected through a serial data line 272.

Further, the printer head 230 also includes parallel/serial converting portion 240 constituted by a plurality of shift registers 241-1 to 241-n and adapted to convert the serial data outputted from the parallel/serial converting portion 223 into parallel data and to output such parallel data, a recording element portion 260 constituted by a plurality of recording elements 261-1 to 261-n and adapted to discharge the ink onto the recording medium on the basis of the parallel data outputted from the parallel/serial converting portion 240, and a drive portion 250 constituted by a plurality of drivers 251-1 to 251-n and adapted to drive heater boards 261-1 to 261-n on the basis of the parallel data outputted from the parallel/serial converting portion 240.

In the printer apparatus 220 having the above-mentioned arrangement, when the printer information is transferred from the host computer 10 by using the computer communication interface, such information is inputted through the interface 221, and, in the MPU 222, the inputted information is converted in a software manner, and the converted data is converted into the serial data in the parallel/serial converting portion 223 and then is inputted to the printer head 230. In the printer head 230, the serial data inputted to the parallel/serial converting portion 240 is converted into the parallel data and then is outputted, and the drivers 251-1 to 251-n are driven on the basis of the outputted data, with the result that the recording elements 261-1 to 261-n are heated, thereby discharging the ink onto the recording medium to effect the recording.

In this way, in the conventional printer apparatus, the transferring of the printer information is effected between the printer apparatus and the host computer by using the computer communication interface, and the printer information transferred to the printer apparatus is supplied to the printer head after it is converted into the processable form.

In the above-mentioned conventional printer apparatus, although the computer communication interface is used for transferring the printer information between the host computer and the printer apparatus, in the printer head, since the recording operation cannot be performed on the basis of the printer information using the computer communication interface, the printer information transferred from the host computer to the printer apparatus is supplied to the printer head after it is converted into the processable form in the printer apparatus.

In an arrangement shown in FIG. 6, the printer information transferred from the host computer to the printer apparatus is firstly converted in the software manner in the MPU 222 and then is converted into the serial data in the parallel/serial converting portion 223.

Thus, load of the converting operation and the converting system becomes great. If the data is transferred from the host computer at a high speed, the data is stayed in the printer apparatus, thereby causing problems that the recording speed is reduced and that the cost is increased.

In a case where the data transferring between the host computer and the printer apparatus is effected at a low speed (print head having 64 nozzles is driven at 6.0 kHz), although the above problems do not arise, in case of the high speed transferring (print head having 304 nozzles is driven at 9.6 kHz), high serial data transferring of 2.9 MHz (304×9.6 kHz) is reached, with the result that noise generated in the high speed transferring will affects a bad influence upon the surroundings and/or the transferring wave form will be distorted to result in data error.

To avoid this, Japanese Patent Application Laid-open No. 7-76153 discloses a printer apparatus in which a printer head is provided with an interface for receiving print data transferred from a host computer, a CPU, a ROM, a RAM and a driver for driving a main body of the apparatus so that data processing in the printer body is effected in the printer head and performance of the printer is improved.

Further, Japanese Patent Application Laid-open No. 10-31566 discloses a printer apparatus in which image data having format processable by a printer head is formed by a host computer so that data processing load in a body of the printer is reduced and performance of the printer is improved.

However, in the printer apparatus disclosed in the Japanese Patent Application Laid-open No. 7-76153 and Japanese Patent Application Laid-open No. 10-31566, since supposing that the data transferring between the host computer and the printer apparatus is effected at the low speed, high speed transferring, particularly, high speed transferring more than 3 Mbps is not perceived.

Further, in the technique disclosed in the Japanese Patent Application Laid-open No. 10-31566, only the data transferred to the printer apparatus by the host computer is disclosed.

SUMMARY OF THE INVENTION

The present invention is made in consideration of recent high speed data transferring which was not perceived in the above-mentioned conventional techniques, and an object of the present invention is to provide a printer head and a printer apparatus, in which recording can be effected without reduction of a processing speed even when data is transferred from a host computer at a high speed.

To achieve the above object, according to the present invention, there is provided a printer head having a plurality of print elements for effecting recording on a recording medium on the basis of printer information inputted from outside, comprising an interface circuit for converting input of the printer information corresponding to communication interface standard for high speed data transferring into data processable in the print head and for outputting the converted data, and in which the recording on the recording medium is effected by the print elements in accordance with the printer information outputted from the interface circuit.

The interface circuit means, that it is provided with a controller circuit for controlling a communication protocol to be used for the communicating with an external equipment through the interface circuit.

Further, it may be arranged that an interface portion and a controller circuit are integrated with or separated from each other.

Further, the present invention provides a printer head having a plurality of print elements for effecting recording on a recording medium on the basis of printer information inputted from outside, comprising an interface circuit for converting input of the printer information corresponding to communication interface standard for high speed data transferring into data processable in the print head and for outputting the converted data, and a plurality of drivers for driving the plurality of print elements, and in which the interface circuit and the plurality of drivers are directly connected by an internal bus.

The printer head may include a motor for shifting the recording medium and the printer head relatively on the basis of the printer information outputted from the interface circuit.

The communication interface standard may be conformed to IEEE 1394 standard.

Alternatively, the communication interface standard may be conformed to USB (universal serial bus) 1.1 standard.

Alternatively, the communication interface standard may be conformed to USB (universal serial bus) 2.0 standard.

Alternatively, the communication interface standard may be conformed to IrDA SIR 2.0 standard.

Alternatively, the communication interface standard may be conformed to LAN Ethernet IEEE 802.3 standard.

The interface circuit may be provided on a substrate on which the print elements are provided.

A transferring speed of the printer information may be greater than 3 Mbps.

The present invention may includes the print head and the motor.

According to another aspect of the present invention, there is provided a printer apparatus for effecting recording on a recording medium on the basis of printer information inputted from outside, in which the printer information corresponding to communication interface standard for high speed data transferring is inputted to a print head via a distributor or HUB for distributing the printer information.

It means that the distributor or HUB is provided with a controller circuit for controlling a communication protocol of interface which an external equipment and a printer head.

Further, the distributer or HUB may be integrated with or separated from the control circuit.

The print head may include an interface circuit for converting input of the printer information corresponding to the communication interface standard into data processable in the print head and for outputting the converted data, and a plurality of print elements for effecting recording on a recording medium on the basis of printer information outputted from the interface circuit.

The apparatus may include an interface circuit conformed to the interface standard, and wherein control is effected so that the printer information is recorded on a predetermined area of the recording medium.

According to the present invention having the above-mentioned arrangement, in the interface circuit of the print head, since the printer information transferred from the data output side and corresponding to the communication interface standard for high speed data transferring is converted into the form processable in the print head and the recording on the recording medium is effected on the basis of the converted printer information, the number of data conversion operations in the printer apparatus is reduced, with the result that the amount of data stayed in the printer apparatus is reduced, thereby operating the printer system at a high speed.

DESCRIPTION OF THE PREFERRED EMBODIMENTS

The present invention will now be explained in connection with embodiments thereof with reference to the accompanying drawings.

First Embodiment

Figure 1:
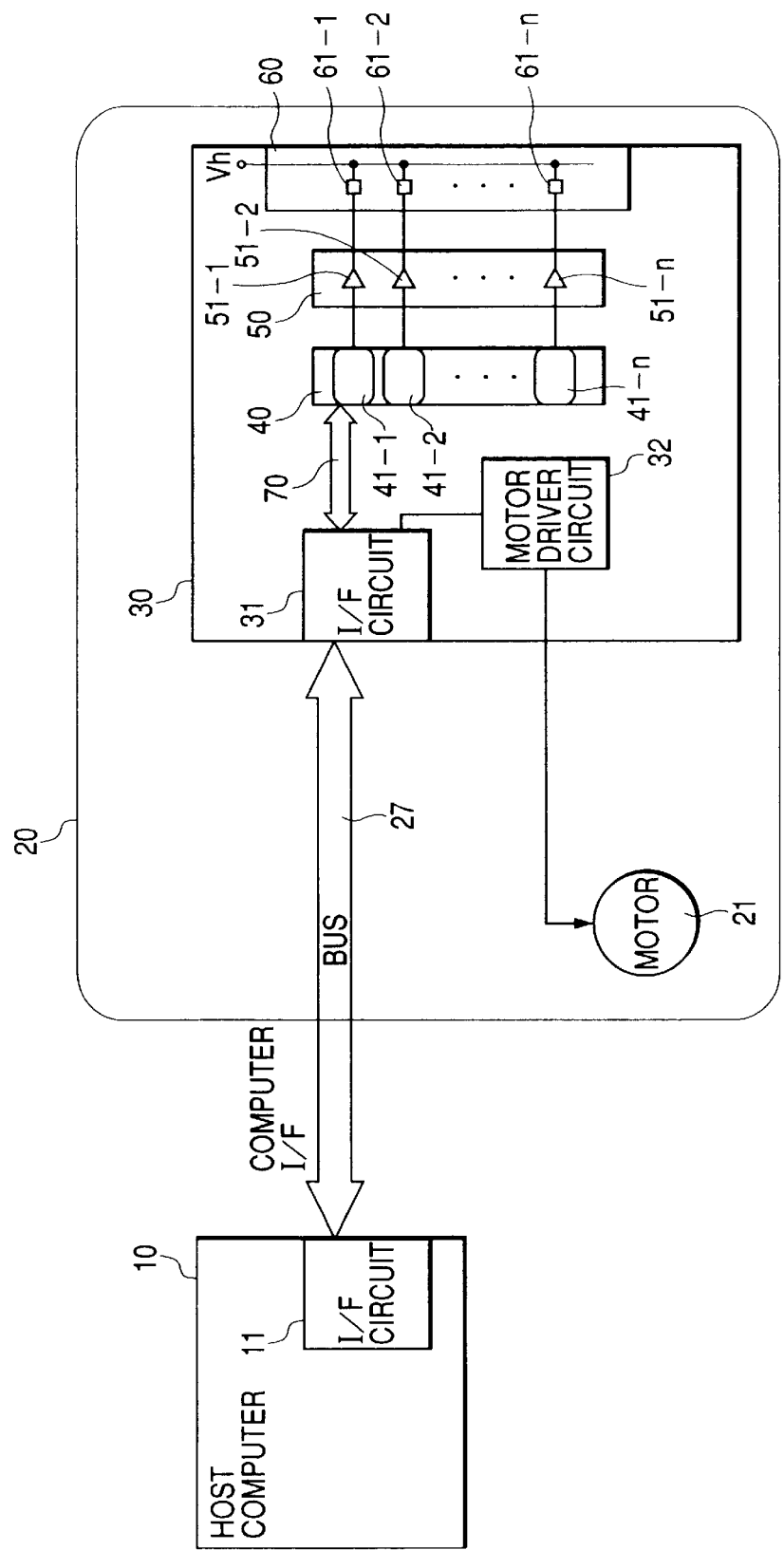
FIG. 1 is a block diagram of a system using a printer apparatus having a printer head according to an embodiment of the present invention.

FIG. 1 is a block diagram of a system using a printer apparatus having a printer head according to a first embodiment of the present invention.

As shown in FIG. 1, in a first embodiment of the present invention, printer information is transferred between a printer apparatus 20 and a host computer 10 by using a computer communication interface. To this end, the host computer 10 includes an interface circuit 11 for outputting the printer information to the printer apparatus 20, and the printer apparatus 20 includes a printer head 30 effecting recording by discharging ink onto a recording medium (not shown) on the basis of the printer information transferred from the host computer 10, and a motor 21 for conveying the recording medium on the basis the printer information transferred from the host computer 10.

Further, the printer head 30 includes an interface circuit 31 for receiving the printer information transferred from the host computer 10 by using the computer communication interface, a motor driver circuit 32 for driving the motor 21 on the basis of the printer information inputted through the interface circuit 31, a recording element driver circuit 40, a recording element portion 60 constituted by a plurality of recording elements 61-1 to 61-n and adapted to record an image on the recording medium on the basis of parallel or serial data based on a communication protocol of various I/F outputted from the interface circuit 31, and a transistor portion 50 constituted by a plurality of transistors 51-1 to 51-n and adapted to drive the recording elements 61-1 to 61-n.

Incidentally, in the interface circuits 11, 31, interfaces having IEEE 1394 standard are used.

Now, an operation of the printer apparatus having the above-mentioned arrangement will be explained.

Further, IEEE 1394 is included in a controller circuit.

When the printer information is transferred from the host computer 10 by using the computer communication interface, the transferred printer information is inputted to the interface circuit 31 of the printer head 30, and, in the interface circuit 31, the printer information is converted into a format processable in the printer head 30 and then is outputted.

The printer information outputted from the interface circuit 31 is inputted to the motor driver circuit 32.

In the motor driver circuit 32, the rotation of the motor 21 is controlled on the basis of the inputted printer information, with the result that the recording medium is conveyed at a speed based on the printer information.

Further, in the recording element driver circuit 40, data based on the printer information inputted via an internal bus 70 is outputted.

The printer information outputted from the recording element driver circuit 40 is inputted to the transistors 51-1 to 51-n in the transistor portion 50, so that the transistors 51-1 to 51-n are driven on the basis of the inputted printer information. As a result, the image is recorded on the recording medium by the recording elements 61-1 to 61-n in the recording element portion 60.

In this way, according to the illustrated embodiment, the motor control information (for the printer body) corresponding to the printer information is formed in the printer head 30, and the motor 21 is driven via the driver circuit 32, and, further, the transferring of the printer information in the printer apparatus 20 is effected by the internal bus, thereby permitting the high speed operation of the printer system.

Particularly, in case of recording elements of 300 bits, when the internal bus is selected to 300 bits, the transferring can be performed at once. Further, even when the internal bus is selected to 150 bits, the transferring is completed only with two times, with the result that high speed transferring and high speed recording can be realized. The number of transferring operations can be obtained by dividing the number of the recording elements by the bits of the internal bus.

Figure 2:
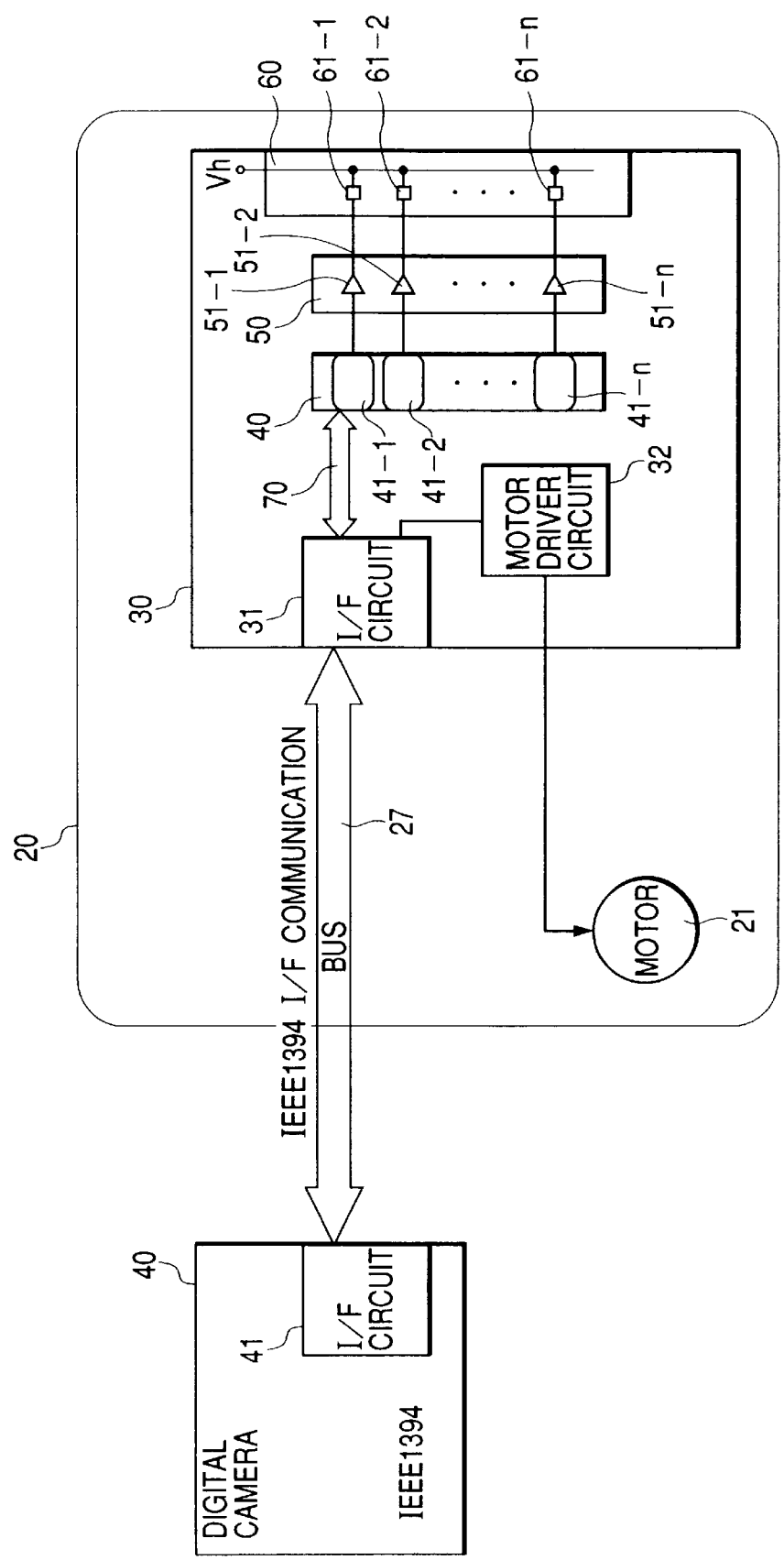
FIG. 2 is a block diagram showing an example that the printer apparatus of FIG. 1 is connected to a digital camera.

FIG. 2 is a block diagram showing an example that the printer apparatus of FIG. 1 is connected to a digital camera.

As shown in FIG. 2, when the printer apparatus of FIG. 1 is connected to the digital camera, in the interface circuit 31 of the printer head 30, since the interface having IEEE 1394 standard is used, the printer apparatus 20 and the digital camera using the interface having IEEE 1394 standard are connected without via the host computer, so that the image data received in the digital camera 40 is directly transferred to the printer apparatus 20. In the interface circuit 31 of the printer head 31, the image data is converted into the format processable by the printer head 30, and, thereafter, in the similar manner to the above, the image data transferred from the digital camera is recorded on the recording medium.

Second Embodiment

Figure 3:
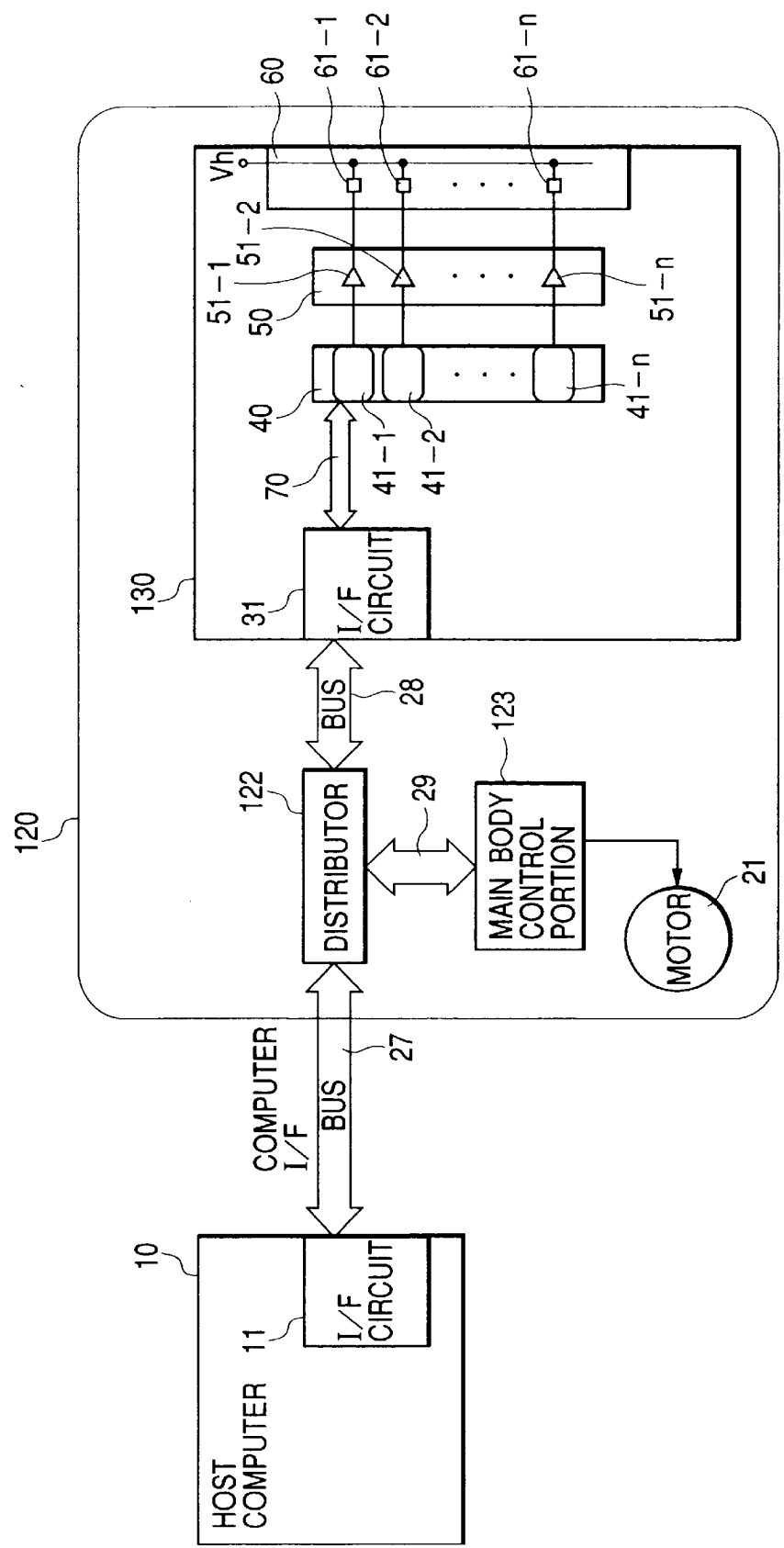
FIG. 3 is a block diagram of a system using a printer apparatus having a printer head according to another embodiment of the present invention.

FIG. 3 is a block diagram of a system using a printer apparatus having a printer head according to a second embodiment of the present invention.

In this embodiment, as shown in FIG. 3, printer information is transferred between a printer apparatus 120 and a host computer 10 by using a computer communication interface. To this end, the host computer 10 includes an interface circuit 11 for outputting the printer information to the printer apparatus 120, and the printer apparatus 120 includes a motor 21 for conveying a recording medium, a body control portion 123 for controlling the motor 21 on the basis of the printer information distributed by a distributor 122, and a printer head 130 effecting recording by discharging ink onto the recording medium (not shown) on the basis of the printer information distributed by the distributor 122, the distributor 122 serving to distribute the printer information transferred from the host computer 10 into the motor 21 and the printer head 130.

Further, the printer head 130 includes an interface circuit 31 for receiving the printer information distributed by the distributor 122 by using the computer communication interface, a recording element portion 60 constituted by a plurality of recording elements 61-1 to 61-n and adapted to discharge the ink onto the recording medium on the basis of parallel data outputted from the interface circuit 31, and a transistor portion 50 constituted by a plurality of transistors 51-1 to 51-n and adapted to drive the recording elements 61-1 to 61-n on the basis of the parallel data outputted from the interface circuit 31.

Incidentally, in the interface circuits 11, 31, interfaces having IEEE 1394 standard are used.

Now, an operation of the printer apparatus having the above-mentioned arrangement will be explained.

When the printer information is transferred from the host computer 10 by using the computer communication interface, the transferred printer information is inputted to the distributor 122, where the inputted printer information is distributed into and outputted to the motor 21 and the printer head 130.

The printer information outputted from the distributor 122 is inputted to the body control portion 123, where the rotation of the motor 21 is controlled on the basis of control data in the inputted printer information, with the result that the recording medium is conveyed at a speed based on the printer information.

Further, the printer information outputted from the distributor 122 is inputted to the interface circuit 31 of the printer head 130, and, in the interface circuit 31, the printer information is converted into a format processable in the printer head 130 and then is outputted.

The printer information converted into pararell or sirial data based on various interface standards in the interface circuit 31 is inputted to the transistors 511 to 51-n in the transistor portion 50, respectively, so that the transistors 51-1 to 51-n are driven on the basis of the inputted printer information. As a result, the recording elements 61-1 to 61-n of the recording element portion 60 are heated, so that the ink is discharged from the recording element portion 60 onto the recording medium.

In this way, according to the illustrated embodiment, in the distributor 122, the printer information transferred from the host computer 10 is distributed into the motor 21 and the printer head 130. Thus, since the control of the motor 21 and the recording in the printer head 130 are effected independently, efficiency of the recording operation is improved.

Incidentally, in the above-mentioned two embodiments, while an example that the interface having IEEE 1394 standard are used in the interface circuits was explained, the present invention is not limited to such an example, but, interfaces conformed to communication interface standard used in a computer to which the interfaces are connected, such as interfaces having USB (universal serial bus) standard, interfaces having IrDA SIR 2.0 standard, interfaces having LAN Ethernet IEEE 802.3 standard may be used. Further, in the above-mentioned two embodiments, the data is transferred at a speed greater than 3 Mbps.

Figure 4:
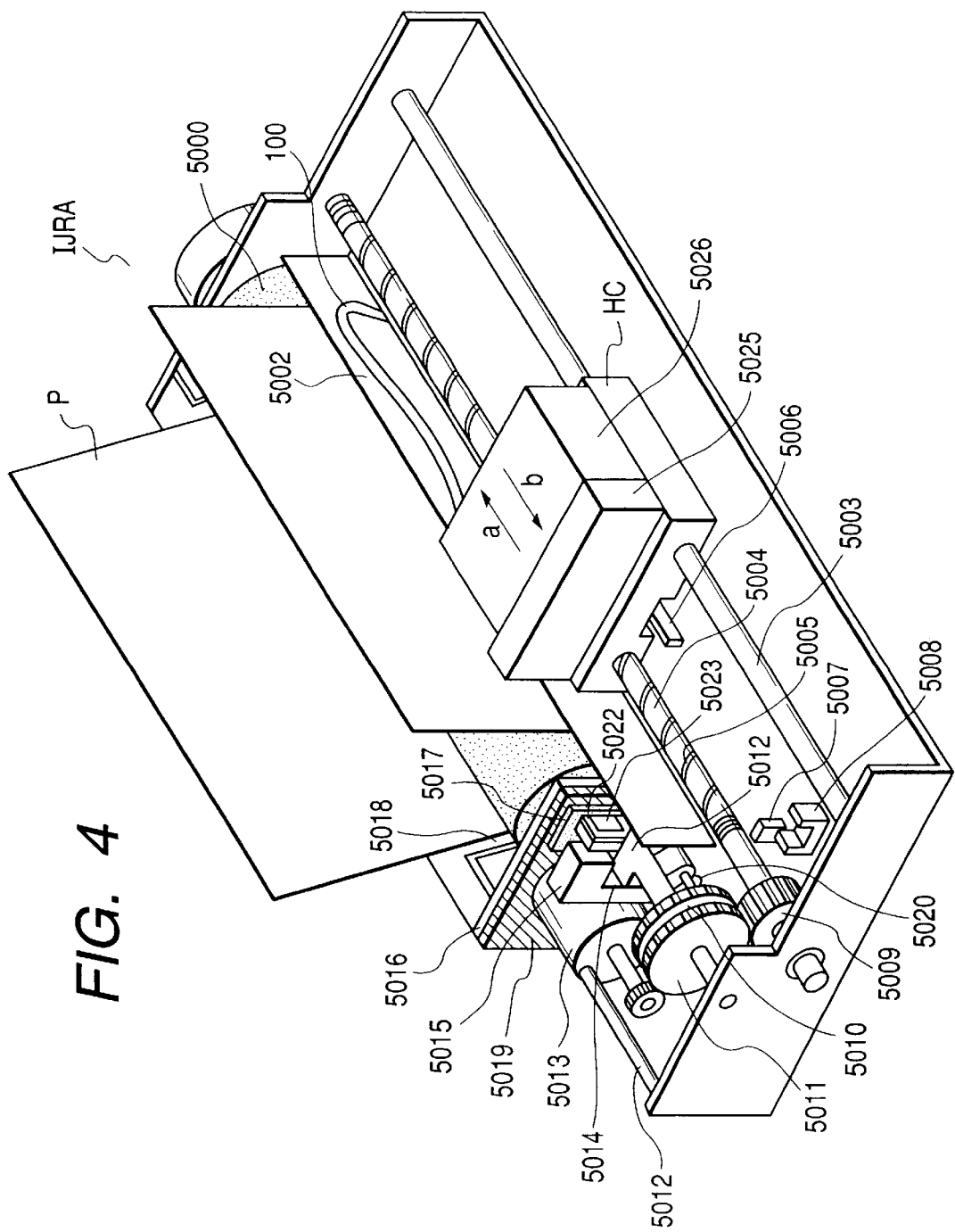
FIG. 4 is a conceptional view of an ink jet recording apparatus IJRA to which the printer head of the present invention is applied.

FIG. 4 is a conceptional view of an ink jet recording apparatus IJRA to which the printer head of the present invention is applied.

In this apparatus, a carriage HC has a pin (not shown) engaged by a helical groove 5005 of a lead screw 5004 rotated via driving force transmitting gears 5011, 5009 in synchronous with forward and reverse rotations of a drive motor 5013, so that the carriage can be reciprocally shifted in directions shown by the arrows a, b. A recording head portion 5025 and an ink tank portion 5026 are mounted on the carriage HC. A hold-down plate 5002 serves to urge a paper sheet P against a platen 5000 along a shifting direction of the carriage. Photo-couplers 5007, 5008 act as home position detecting means for ascertaining the presence/absence of a lever 5006 of the carriage in this area and for switching rotational direction of the motor 5013. A support member 5016 serves to support a cap member 5022 for capping a front surface of the recording head, and suction means 5015 for effecting suction of the interior of the cap serves to perform suction recovery of the recording head via an opening 5023 of the cap. A member 5019 permits a shifting movement of a cleaning blade 5017 in a front-and-rear direction, and these elements are supported by a body support plate 5018. The blade is not limited to the illustrated one, but, any well-known cleaning blade may be used. Further, a lever 5012 for starting the suction for the suction recovery is shifted as a cam 5020 engaged by the carriage is shifted. The shifting movement is controlled by controlling the driving force from the drive motor by known transmitting means such as a clutch.

Regarding the capping, cleaning and suction recovery, although the desired processing may be effected at respective positions by the action of the lead screw 5004 when the carriage HC is positioned at an area near the home position, the desired processing may be effected at well-known timing.

Further, in the present invention, although the recording head cartridge is mounted on the carriage HC, in the illustrated embodiment, the recording head cartridge is of type in which a recording head portion 5025 and an ink tank portion 5026 can be separated from each other.

Further, the recording head cartridge is connected to a main body of the recording apparatus via a high speed data transfer bus 100 so that the data transferring according to I/F standard such as IEEE 1394 standard.

Third Embodiment

Figure 5:
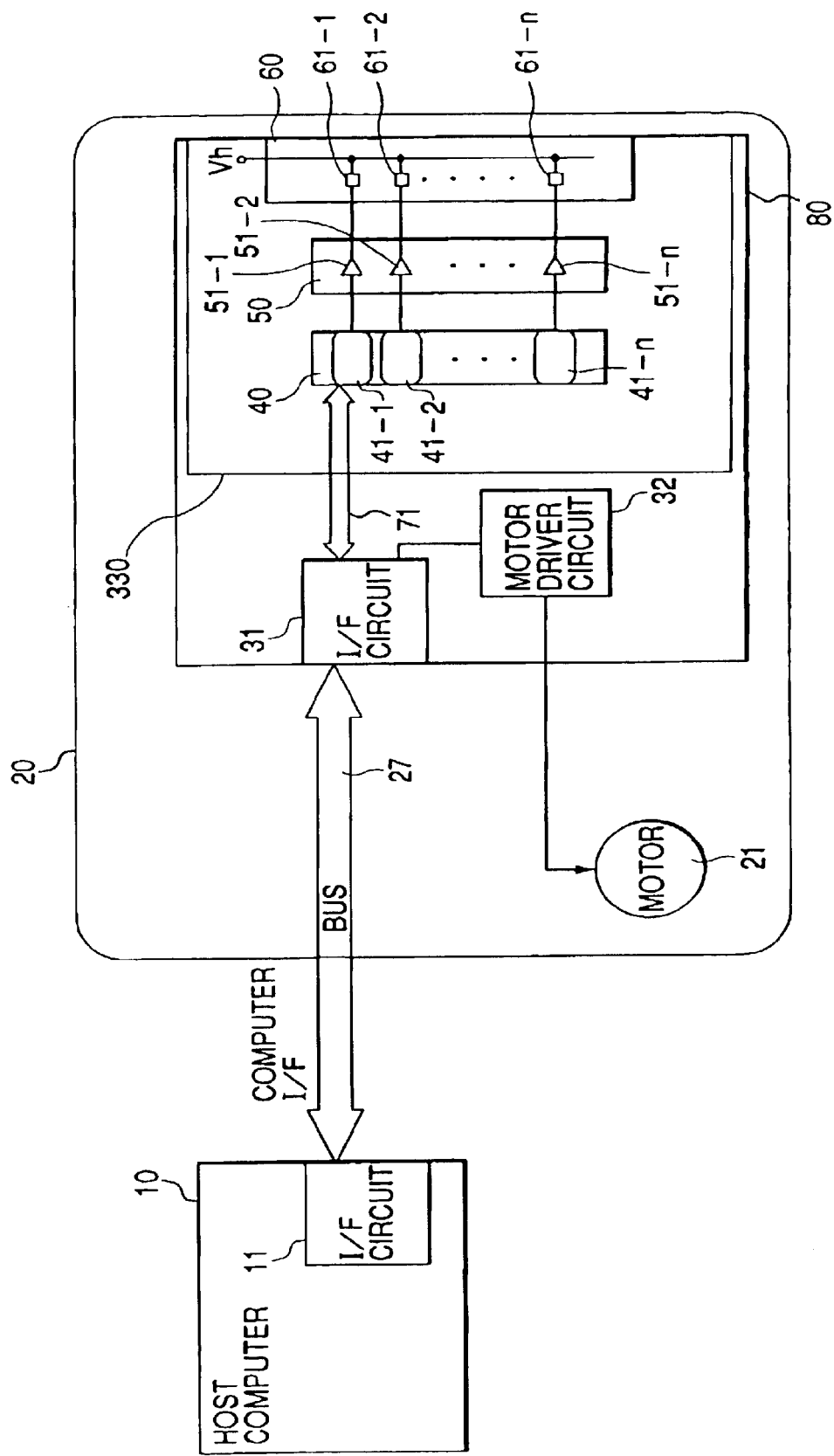
FIG. 5 is a block diagram of a system using a printer apparatus having a printer head according to a third embodiment of the present invention.
Figure 6:
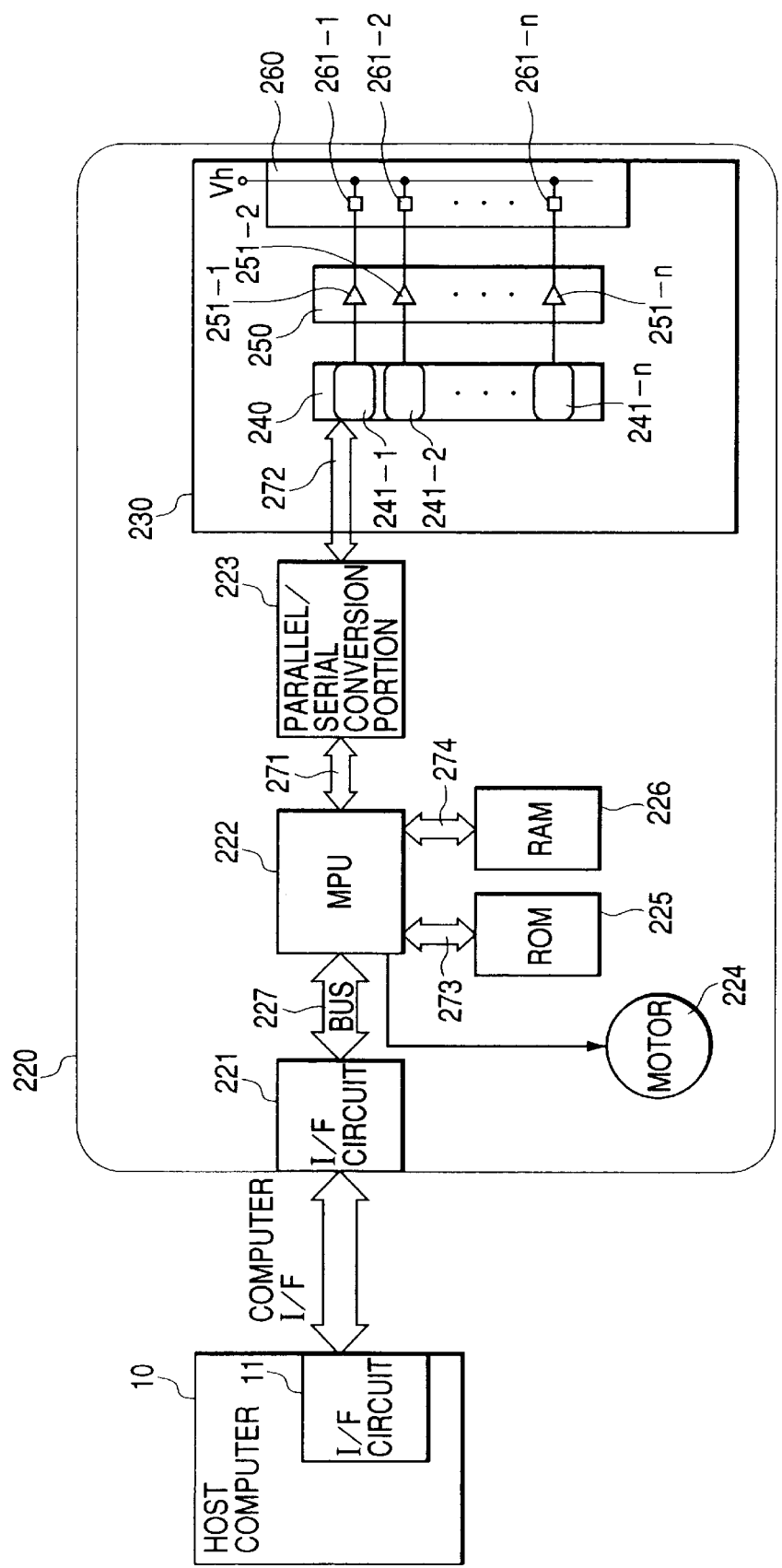
FIG. 6 is a block diagram showing a system using a conventional printer apparatus.

FIG. 5 is a block diagram of a system using a printer apparatus having a printer head according to a second embodiment of the present invention.

As shown in FIG. 5, this embodiment differs from the embodiment shown in FIG. 1 in the points that the interface circuit 31 and the motor driver circuit 32 are provided on a carriage 80, and the interface circuit 31 and a printer head 330 are connected via a bus 71.

Incidentally, in the above-mentioned printer head, a thermal head, a piezo-head or a BJ head can be used, as well as in ink jet head.

As mentioned above, in the present invention, since the printer head includes the interface circuit for converting the printer information transferred from the data output side and corresponding to the communication interface standard for the high speed data transferring into the format processable in the printer head, the amount of data which may be stayed in the printer system can be reduced, thereby improving the processing speed of the printer system.

Further, the wiring in the printer body can be prevented from being complicated.

In addition, the printer system which does not depend upon a host computer connected to the system can be obtained.

What is claimed is:

1. A printer head having a plurality of print element portions for effecting recording on a recording medium based on printer information inputted from outside, comprising:
   an interface circuit for converting input of the printer information corresponding to a communication interface standard for high speed data transferring, into data processable in said print head and for outputting the converted data,
   wherein recording on the recording medium is effected by said print element portions in accordance with the printer information outputted from said interface circuit.

2. A printer head having a plurality of print element portions for effecting recording on a recording medium based on printer information inputted from outside, comprising:
   an interface circuit for converting input of the printer information, corresponding to a communication interface standard for high speed data transferring, into data processable in said print head and for outputting the converted data; and
   a plurality of drivers for driving said plurality of print elements,
   wherein said interface circuit and said plurality of drivers are directly connected by an internal bus.

3. A printer head according to either of claims 1 and 2, wherein a motor for shifting the recording medium and said printer head relatively is driven the printer information outputted from said interface circuit.

4. A printer head according to either one of claims 1 and 2, wherein the communication interface standard conforms to IEEE 1394 standard.

5. A printer head according to either one of claims 1 and 2, wherein the communication interface standard conforms to USB (universal serial bus) 1.1 standard.

6. A printer head according to either one of claims 1 and 2, wherein the communication interface standard conforms to USB (universal serial bus) 2.0 standard.

7. A printer head according to either one of claims 1 and 2, wherein the communication interface standard conforms to IrDA SIR 2.0 standard.

8. A printer head according to either one of claims 1 and 2, wherein the communication interface standard conforms to LAN Ethernet IEEE 802.3 standard.

9. A printer head according to either one of claims 1 and 2, wherein said interface circuit is provided on a substrate on which the print element portions are provided.

10. A printer head according to either one of claims 1 and 2, wherein a transferring speed of the printer information is greater than 3 Mbps.

11. A printer apparatus comprising:
said printer head and said motor according to claim 3.

12. A printer apparatus for effecting recording on a recording medium based on printer information inputted from outside, wherein:
the printer information, which corresponds to a communication interface standard for high speed data transferring, is inputted to a print head via a distributor for distributing the printer information and converted to data processable in the print head.

13. A printer apparatus according to claim 12, wherein said print head comprises:
an interface circuit for performing conversion of the printer information into data processable in said print head and for outputting the converted data; and
a plurality of print elements for effecting recording on a recording medium based on printer information outputted from said interface circuit.

14. A printer apparatus according to claim 12, further comprising an interface circuit conformed to the interface standard, and wherein control is effected so that the printer information is recorded on a predetermined area of the recording medium.

15. A printer apparatus according to any one of claims 12 to 14, wherein the communication interface standard is conformed to IEEE 1394 standard.

16. A printer apparatus according to either one of claims 12 and 13, wherein the communication interface standard is conformed to USE (universal serial bus) 1.1.

17. A printer apparatus according to either one of claims 12 and 13, wherein the communication interface standard conforms to USE (universal serial bus) 2.0.

18. A printer apparatus according to any one of claims 12 to 14, wherein the communication interface standard conforms to IrDA SIR 2.0 standard.

19. A printer apparatus according to any one of claims 12 to 14, wherein the communication interface standard conforms to LAN Ethernet IEEE 802.3 standard.

20. A printer apparatus according to any one of claims 12 to 14, wherein a transferring speed of the printer information is greater than 3 Mbps.

21. A printer apparatus comprising:
a printer head including a plurality of print element portions for effecting recording on a recording medium based on printer information inputted from outside; and
a mechanism for conveying the recording medium,
wherein the printer head is provided with an interface circuit for converting input of the printer information, corresponding to a communication interface standard for high speed data transferring, into data processible in said printer head and for outputting the converted data, and
recording is effected on the recording medium by said print element portions in accordance with the printer information outputted from said interface circuit.

* * * * *

UNITED STATES PATENT AND TRADEMARK OFFICE
CERTIFICATE OF CORRECTION

PATENT NO. : 6,798,535 B1
DATED : September 28, 2004
INVENTOR(S) : Nobuyuki Matsumoto et al.

It is certified that error appears in the above-identified patent and that said Letters Patent is hereby corrected as shown below:

Column 2,
Line 34, "affects" should read -- affect --.

Column 3,
Line 52, "includes" should read -- include --.

Column 6,
Line 62, "pararell or sirial" should read -- parallel or serial --.

Column 8,
Line 56, "driven" should read -- driven based on --.

Column 10,
Lines 6 and 9, "USE" should read -- USB --.

Signed and Sealed this

Twenty-eighth Day of December, 2004

JON W. DUDAS
*Director of the United States Patent and Trademark Office*